(12) United States Patent
Zhou et al.

(10) Patent No.: US 9,049,169 B1
(45) Date of Patent: Jun. 2, 2015

(54) MOBILE EMAIL PROTECTION FOR PRIVATE COMPUTER NETWORKS

(71) Applicant: Trend Micro Incorporated, Tokyo (JP)

(72) Inventors: Yi Zhou, Nanjing (CN); Richard Ku, Pasadena, CA (US)

(73) Assignee: Trend Micro Incorporated, Tokyo (JP)

( * ) Notice: Subject to any disclaimer, the term of this patent is extended or adjusted under 35 U.S.C. 154(b) by 113 days.

(21) Appl. No.: 13/906,089

(22) Filed: May 30, 2013

(51) Int. Cl.
*H04L 29/06* (2006.01)
*H04L 29/08* (2006.01)
*G06F 9/50* (2006.01)

(52) U.S. Cl.
CPC ............ *H04L 63/0209* (2013.01); *H04L 29/06* (2013.01); *H04L 67/34* (2013.01); *G06F 9/505* (2013.01)

(58) Field of Classification Search
CPC ....... G06F 9/505; G06F 21/577; G06F 21/55; G06N 3/0472; H04L 69/329; H04L 63/0227; H04L 29/06; H04L 63/1408; H04L 63/1416; H04L 63/1425; H04L 63/1441; H04L 63/145; H04L 63/1483; H04L 63/164; H04L 63/166; H04L 2463/141; H04L 67/34; H04L 67/306; H04L 67/325; H04L 67/10; H04L 67/327
USPC ................................................ 726/11, 22, 28
See application file for complete search history.

(56) References Cited

U.S. PATENT DOCUMENTS

| | | | |
|---|---|---|---|
| 6,091,412 A | 7/2000 | Simonoff et al. | |
| 6,356,931 B2 | 3/2002 | Ismael et al. | |
| 6,401,134 B1 | 6/2002 | Razavi et al. | |
| 6,433,794 B1 | 8/2002 | Beadle et al. | |
| 6,492,995 B1 | 12/2002 | Atkin et al. | |
| 6,647,544 B1 | 11/2003 | Ryman et al. | |
| 6,757,895 B1 | 6/2004 | Beadle et al. | |
| 6,799,195 B1 | 9/2004 | Thibault et al. | |
| 6,842,777 B1 | 1/2005 | Tuli | |
| 6,842,897 B1 | 1/2005 | Beadle et al. | |
| 6,941,552 B1 | 9/2005 | Beadle et al. | |
| 6,976,059 B1 | 12/2005 | Rogalski et al. | |

(Continued)

FOREIGN PATENT DOCUMENTS

| | | |
|---|---|---|
| EP | 1 316 873 | 4/2003 |
| EP | 1 377 892 | 9/2004 |

(Continued)

OTHER PUBLICATIONS

Exchange ActiveSync—Wikipedia, the free encyclopedia, 5 sheets [retrieved on May 23, 2013]. Retrieved from the Internet: http://en.wikipedia.org/wiki/Exhange_ActiveSync.

(Continued)

*Primary Examiner* — Chau Le
*Assistant Examiner* — Don Zhao
(74) *Attorney, Agent, or Firm* — Okamoto & Benedicto LLP

(57) ABSTRACT

Email synchronization between a mobile device and a messaging server may be performed through a mobile email protection system. The mobile email protection system may parse network traffic for the email synchronization to retrieve an email element of an email. The mobile email protection system may scan the email element for protected content indicated in preconfigured compliance templates. The mobile email protection system may also scan the email element for prohibited content to prevent the prohibited content from being received by the messaging server.

20 Claims, 3 Drawing Sheets

(56) References Cited

U.S. PATENT DOCUMENTS

| | | | |
|---|---|---|---|
| 7,039,691 | B1 | 5/2006 | Turnidge |
| 7,191,211 | B2 | 3/2007 | Tuli |
| 7,290,129 | B2 | 10/2007 | Chebolu et al. |
| 7,454,459 | B1 * | 11/2008 | Kapoor et al. ............ 709/203 |
| 7,506,257 | B1 | 3/2009 | Chavez et al. |
| 7,606,837 | B2 * | 10/2009 | Shields et al. ............ 1/1 |
| 7,634,811 | B1 | 12/2009 | Kienzle et al. |
| 7,707,627 | B2 * | 4/2010 | Hirsh ............ 726/10 |
| 7,735,138 | B2 | 6/2010 | Zhao |
| 8,023,974 | B1 | 9/2011 | Diao et al. |
| 8,024,790 | B2 | 9/2011 | Zhao et al. |
| 8,239,918 | B1 | 8/2012 | Cohen |
| 8,321,511 | B1 * | 11/2012 | Friend et al. ............ 709/206 |
| 8,726,405 | B1 * | 5/2014 | Bailey et al. ............ 726/29 |
| 2001/0054062 | A1 | 12/2001 | Ismael et al. |
| 2002/0129281 | A1 | 9/2002 | Hatfalvi et al. |
| 2003/0041106 | A1 | 2/2003 | Tuli |
| 2003/0115301 | A1 * | 6/2003 | Koskimies ............ 709/221 |
| 2004/0148608 | A1 | 7/2004 | Gendreau et al. |
| 2004/0158830 | A1 | 8/2004 | Chung et al. |
| 2004/0230643 | A1 | 11/2004 | Thibault et al. |
| 2005/0188361 | A1 | 8/2005 | Cai et al. |
| 2005/0198485 | A1 | 9/2005 | Nguyen et al. |
| 2005/0246176 | A1 | 11/2005 | Creamer et al. |
| 2006/0112342 | A1 | 5/2006 | Bantz et al. |
| 2006/0195595 | A1 * | 8/2006 | Mendez et al. ............ 709/229 |
| 2006/0277408 | A1 * | 12/2006 | Bhat et al. ............ 713/173 |
| 2007/0004391 | A1 * | 1/2007 | Maffeis ............ 455/418 |
| 2007/0079244 | A1 | 4/2007 | Brugiolo |
| 2007/0199058 | A1 | 8/2007 | Baumgart et al. |
| 2007/0258437 | A1 * | 11/2007 | Bennett ............ 370/352 |
| 2008/0134311 | A1 * | 6/2008 | Medvinsky et al. ............ 726/7 |
| 2008/0134330 | A1 * | 6/2008 | Kapoor et al. ............ 726/22 |
| 2009/0030968 | A1 * | 1/2009 | Boudreau et al. ............ 709/201 |
| 2009/0030974 | A1 * | 1/2009 | Boudreau et al. ............ 709/203 |
| 2009/0030995 | A1 * | 1/2009 | Boudreau et al. ............ 709/206 |
| 2009/0031250 | A1 * | 1/2009 | Boudreau et al. ............ 715/810 |
| 2009/0031296 | A1 * | 1/2009 | Boudreau et al. ............ 717/174 |
| 2009/0138547 | A1 * | 5/2009 | Boudreau ............ 709/203 |
| 2009/0199278 | A1 * | 8/2009 | Song ............ 726/6 |
| 2010/0153527 | A1 * | 6/2010 | Venouss ............ 709/223 |
| 2010/0180009 | A1 * | 7/2010 | Callahan ............ 709/217 |
| 2011/0167474 | A1 | 7/2011 | Sinha |
| 2014/0155028 | A1 * | 6/2014 | Daniela et al. ............ 455/411 |

FOREIGN PATENT DOCUMENTS

| | | |
|---|---|---|
| WO | 02/084459 | 10/2002 |
| WO | 03/017068 | 2/2003 |
| WO | 2005066786 | 7/2005 |

OTHER PUBLICATIONS iOS: Setting up Exchange ActiveSync, 3 sheets [retrieved on May 23, 2013]. Retrieved from the internet: http://support.apple.com/kb/ht2480.

Google Dropping Microsoft's Exchange ActiveSync: What Do You Do?, 7 sheets [retrieved on May 23, 2013]. Retrieved from the internet: http://www.pcmag.com/article2/0,2817,2413283,00.asp.

PointSharp ActiveSync Gateway—Benefits, 4 sheets [retrieved on May 7, 2013]. Retrieved from the internet: http://www.pointsharp.com/products/activesync-gateway/activesync-gateway-benefits.

Microsoft Exchange Server—Wikipedia, the free encyclopedia, 11 sheets [retrieved on May 23, 2013]. Retrieved from the internet: http://en.wikipedia.org/wiki/Microsoft_Exhange_Server.

Hadeel Tariq Al-Rayes, "Studying Main Differences between Android & Linux Operating Systems", Oct. 2012, pp. 46-49, vol. 12, No. 5, International Journal of Electrical & Computer Sciences IJECS-IJENS.

* cited by examiner

MOBILE EMAIL PROTECTION FOR PRIVATE COMPUTER NETWORKS

BACKGROUND OF THE INVENTION

1. Field of the Invention

The present invention relates generally to computer security, and more particularly but not exclusively to methods and systems for protecting data transferred between mobile devices and a private computer network.

2. Description of the Background Art

Mobile devices, such as smartphones and tablets, are not only very popular with average consumers but also with corporate users. Today, some corporate computer networks allow employees to synchronize emails between their mobile devices and a corporate messaging server. Although corporate networks typically have some form of computer security, such as data loss prevention (DLP) and antivirus, mobile devices present unique challenges in that they do not have the computing resources of traditional computers. As a result, deploying an agent in a mobile device to perform computer security is relatively difficult and may be resisted by some users. Worse, mobile devices are typically employed outside the corporate network, increasing their exposure to computer security threats and compromising corporate data when allowed to synchronize with the messaging server from outside the corporate network.

SUMMARY

In one embodiment, email synchronization between a mobile device and a messaging server may be performed through a mobile email protection system. The mobile email protection system may parse network traffic for the email synchronization to retrieve an email element of an email. The mobile email protection system may scan the email element for protected content indicated in preconfigured compliance templates. The mobile email protection system may also scan the email element for prohibited content to prevent the prohibited content from being received by the messaging server.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
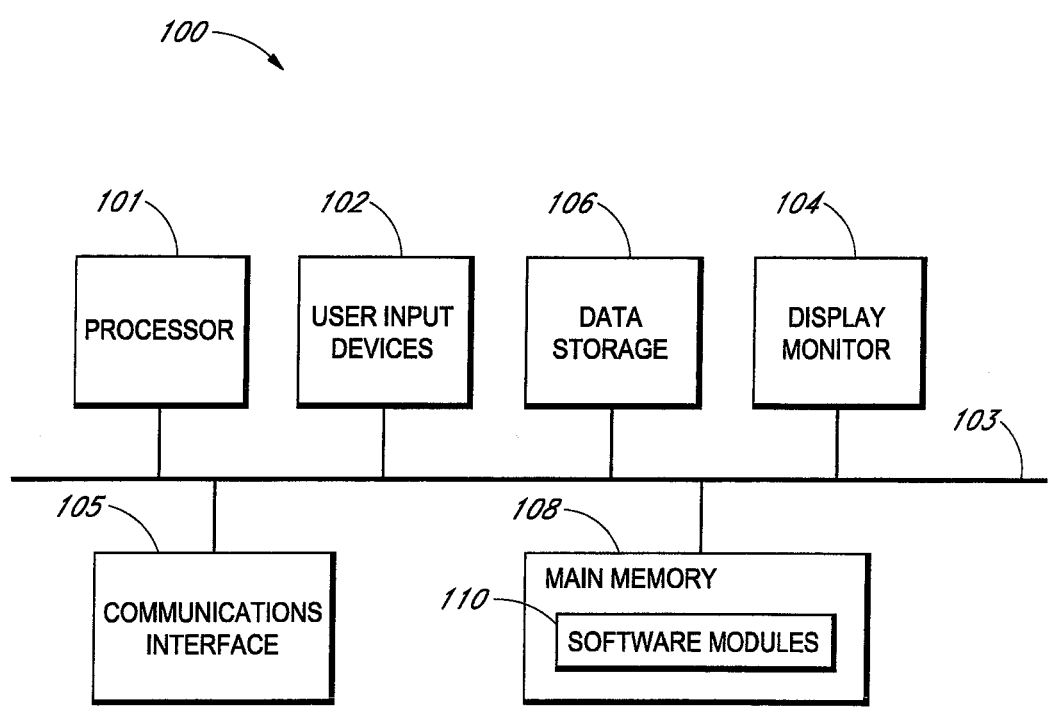
FIG. 1 shows a schematic diagram of a computer that may be employed with embodiments of the present invention.

Referring now to FIG. 1, there is shown a schematic diagram of a computer 100 that may be employed with embodiments of the present invention. The computer 100 may be employed as a mobile email protection system, and other computers described below. The computer 100 may have fewer or more components to meet the needs of a particular application. The computer 100 may include a processor 101. The computer 100 may have one or more buses 103 coupling its various components. The computer 100 may include one or more user input devices 102 (e.g., keyboard, mouse), one or more data storage devices 106 (e.g., hard drive, optical disk, Universal Serial Bus memory), a display monitor 104 (e.g., liquid crystal display, flat panel monitor, cathode ray tube), a computer network interface 105 (e.g., network adapter, modem), and a main memory 108 (e.g., random access memory). The computer network interface 105 may be coupled to a computer network 109, which in this example includes the Internet.

The computer 100 is a particular machine as programmed with software modules 110. The software modules 110 comprise computer-readable program code stored non-transitory in the main memory 108 for execution by the processor 101. As an example, the software modules 110 may comprise a parser, a data loss prevention engine, an antivirus, and an encryption module when the computer 100 is employed as a mobile email protection system.

The computer 100 may be configured to perform its functions by executing the software modules 110. The software modules 110 may be loaded from the data storage device 106 to the main memory 108. An article of manufacture may be embodied as computer-readable storage medium including instructions that when executed by a computer causes the computer to be operable to perform the functions of the software modules 110.

Figure 2:
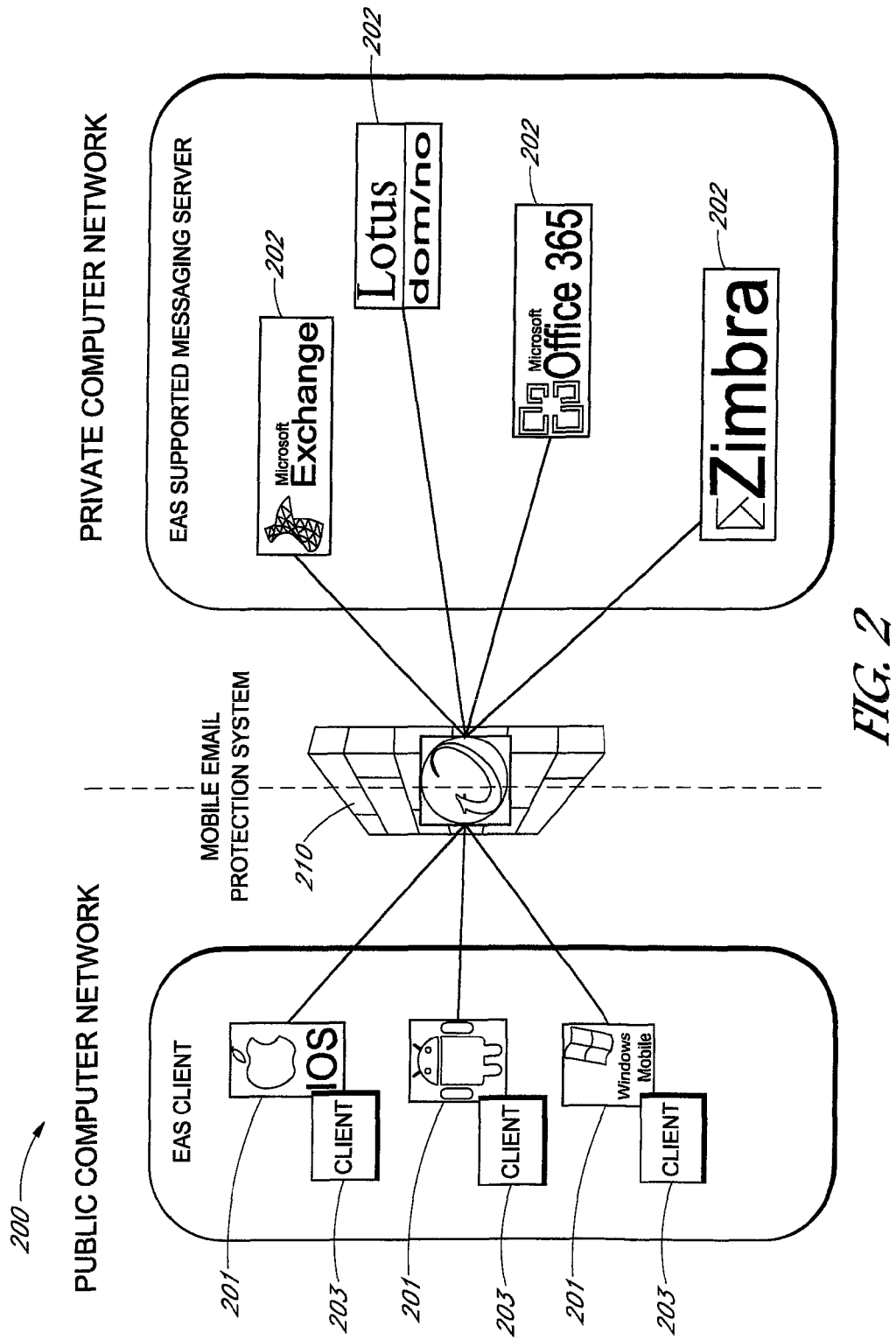
FIG. 2 shows a schematic diagram of a computer system in accordance with an embodiment of the present invention.

FIG. 2 shows a schematic diagram of a computer system 200 in accordance with an embodiment of the present invention. In the example of FIG. 2, the computer system 200 includes a plurality of mobile client devices 201, a mobile email protection system 210, and one or more messaging servers 202. In one embodiment, the mobile email protection system 210 and the one or more messaging servers 202 are part of a private computer network, which in the example of FIG. 2 is a corporate network of a corporation or other private organization. The mobile email protection system 210 may be located on the perimeter of the private computer network, which is also referred to in the field of computer security as the "DMZ."

A messaging server 202 may comprise a server computer that provides a messaging service. In the example of FIG. 2, a messaging server 202 may hosts messaging software, such as the Microsoft Exchange™ software, the Lotus Domino™ software, the Microsoft Office 365™ software, or the VmWare Zimbra™ software, for example. A user of a mobile client device 201 may have a corresponding account on a messaging server 202. Accordingly, email synchronization may involve synchronization of email and other data, such as calendar, notes, contacts, and tasks, between a mobile client device 201 and a corresponding account on an a messaging server 202.

A mobile client device 201 may comprise a mobile device (e.g., smartphone, tablet) running a mobile operating system, such as the ANDROID operating system, the IOS operating system, or the WINDOWS PHONE operating system. As its name implies, a mobile operating system is an operating system designed to run on mobile devices, which are also referred to as "handheld devices." A mobile operating system is lightweight in that it consumes less computing resources, such as processor and memory resources, compared to desktop operating systems. A mobile operating system also supports communications over a mobile phone network, such as a cellular network, to provide telephone functionality. In the example of FIG. 2, the mobile client devices 201 may comprise smartphones and tablets running a mobile operating system. In the example of FIG. 2, the mobile client devices 201 are operating in a public computer network, such as the Internet.

In the example of FIG. 2, a mobile client device 201 includes a client application 203 for sending and receiving email, and keeping calendar, contacts, notes, tasks, and other user information. A user of the mobile client device 201 may employ the client application 203 to send and receive email by way of a corresponding account on a messaging server 202 by performing synchronization between the mobile client device 201 and the messaging server 202. In a nutshell, the user of the mobile client device 201 may compose an email for a recipient using the client application 203, and perform email synchronization between the mobile client device 201 and the messaging server 202 to allow the messaging server 202 to receive the email and forward the email to the recipient. Similarly, the messaging server 202 may receive an email for the user, and provide the email to the client application 203 for viewing by the user when the mobile client device 201 synchronizes emails with the messaging server 202.

In addition to emails, the client application 203 may also provide contacts, calendar, notes, tasks, and other functions typically provided by an email client. When the mobile client device 201 performs email synchronization with a messaging server 202, other data of the client application 203, such as calendar, contacts, tasks, and notes, may also be synchronized between the mobile client device 201 and the messaging server 202. That is, email synchronization may also involve synchronization of other data between a mobile client device 201 and a corresponding account on a messaging server 202. In one embodiment, a mobile client device 201 and a messaging server 202 perform email synchronization in accordance with the Exchange ActiveSync (EAS) protocol. The EAS protocol is an XML-based protocol that communicates over HTTP (or HTTPS) and is designed for synchronization of email, contacts, calendar, tasks and notes from a messaging server to a mobile device.

The mobile email protection system 210 may comprise one or more computers for monitoring email synchronization between mobile client devices 201 and a messaging server 202, preventing protected content from being transferred to an unauthorized mobile client device 201, and preventing prohibited content from being received from a mobile client device 201. The protected content may comprise company confidential data and other sensitive information (e.g., trade secrets, source code, customer information). Prohibited content may comprise data that is non-compliant or otherwise prohibited from being received into the private computer network. The mobile email protection system is configured such that email synchronization between a mobile client device 201 and a messaging server 202 must flow through the mobile email protection system 210. In one embodiment, the mobile email protection system 210 is configured as a reverse-proxy for synchronizing with a messaging server 202.

Figure 3:
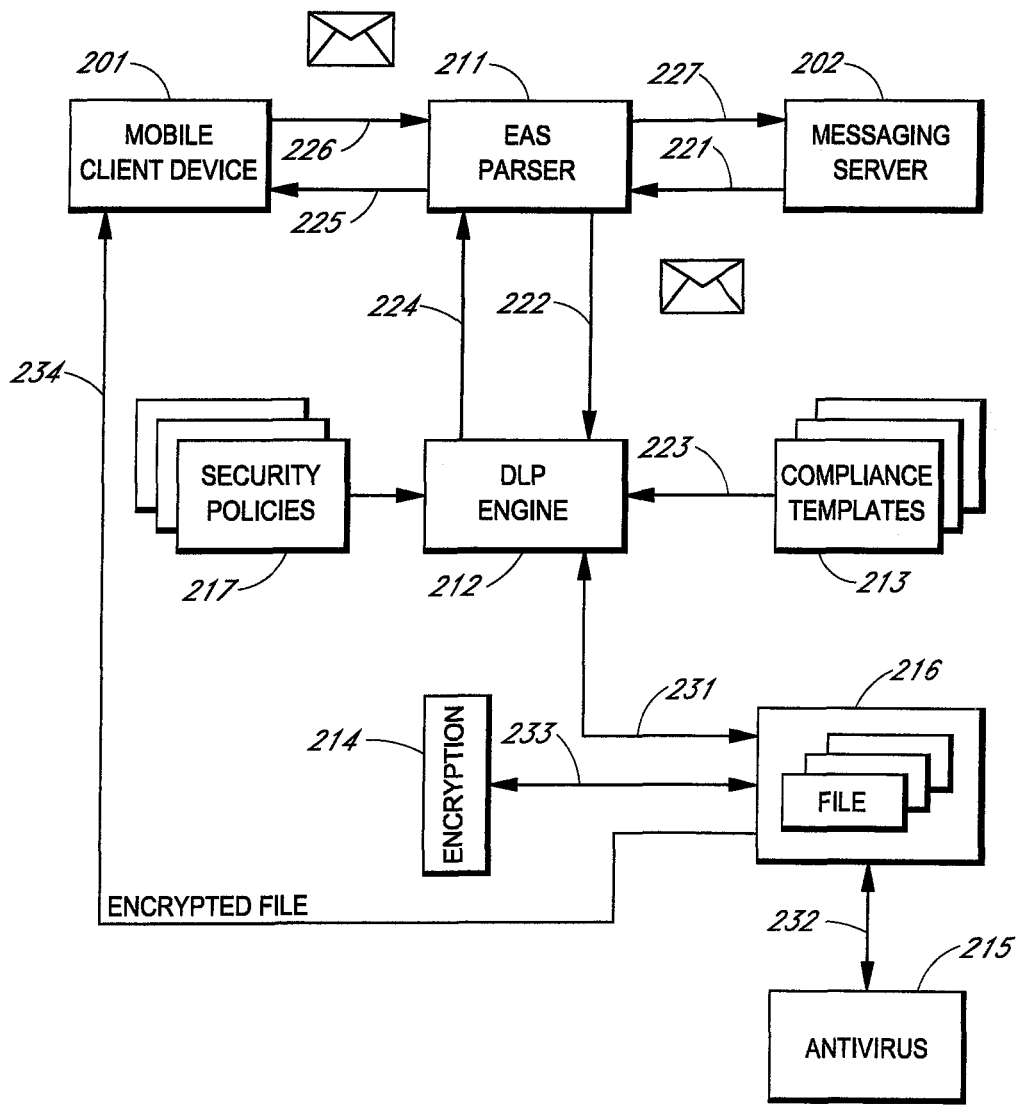
FIG. 3 shows a schematic diagram of a mobile email protection system in accordance with an embodiment of the present invention.

FIG. 3 shows a schematic diagram of the mobile email protection system 210 in accordance with an embodiment of the present invention. In the example of FIG. 3, the mobile email protection system 210 comprises an EAS parser 211, a data loss prevention (DLP) engine 212, a plurality of compliance templates 213, an encryption module 214, and an antivirus 215.

The EAS parser 211 may comprise computer-readable program code for parsing network traffic in accordance with an email synchronization protocol, which in this example is the EAS protocol. In one embodiment, the parser 211 receives EAS network traffic between a mobile client device 201 and a messaging server 202, parses the network traffic to retrieve email elements, and forwards the email elements to the DLP engine 212. The email elements retrieved by the parser 211 from the EAS protocol may include subject, meeting invite, header, contact, message body, and attachment. The EAS parser 211 may also parse the network traffic, or obtain during a login or some other process, device characteristics, such as device type, mobile operating system information, apps, and user of the mobile client device 201, and provide the device characteristics to the DLP engine 212.

The DLP engine 212 may comprise computer-readable program code for scanning data for prohibited or protected content and enforcing security policies for corresponding prohibited or protected content. In one embodiment, the DLP engine 212 scans the email elements retrieved by the parser 211 for protected content indicated in one or more compliance templates 213. A compliance template 213 may comprise predetermined content that needs to be protected for a particular business or country. The DLP engine 212 may scan a retrieved email element for protected content indicated in a corresponding compliance template 213, and enforce a security policy associated with the protected content when the email element includes the protected content.

In one embodiment, a compliance template 213 may comprise preconfigured protected content for a particular country. As a particular example, a compliance template 213 may indicate that the following are personally-identifiable information and are recognized as protected content in France: a) INSEE, Code, b) National Insurance Number, and c) Credit Card Number. As another example, another compliance template 213 may indicate that the following are recognized as protected content in Spain: a) Fiscal Identification Number, b) National Identity Card Number, and c) Social Security Number. Different countries may have different recognized protected contents, such as different recognized personally-identifiable information. The availability of preconfigured compliance templates for particular countries allow for relative ease of deployment. The DLP engine 213 may also consult a database or other listing of protected contents. The DLP engine 213 may employ algorithms employed by typical DLP engines to find protected and prohibited content. For example, the DLP engine 213 may employ a pattern matching algorithm to find protected and prohibited content.

When the DLP engine 213 finds protected content, the DLP engine 213 applies a security policy associated with the protected content. For example, in the case where the DLP engine 213 finds a National Insurance Number for data in a messaging server 202 for a company in France, the DLP engine 213 may consult a corresponding security policy that indicates only a particular user or device is authorized to access that content. If the mobile client device 201 is not an authorized device, the DLP engine 213 may inform the EAS parser 211, or other component, to block the associated network traffic.

The mobile email protection system 210 may include a plurality of security policies 217 governing access to protected content. An administrator may set the security policies 217 based on direction (e.g., whether the data being synchronized is coming from or going to a mobile client device 201), people (e.g., user authorized to access a particular account or data), and type of mobile client device 201 (e.g., device vendor, mobile operating system and version, mobile apps on the device). The administrator may also set in the security policies 217 the response actions to take when protected content is being accessed by unauthorized users or devices. The response actions may include blocking the email synchronization in total, or blocking particular synchronization, such as blocking email attachment, calendar, contacts, notes, or tasks synchronization.

In an example operation, a mobile client device 201 may perform email synchronization with a messaging server 202 in accordance with the EAS protocol. The incoming network traffic for the email synchronization is received by the EAS parser 211 from the mobile client device 201 (see arrow 226). The EAS parser 211 parses the network traffic to retrieve email elements, such as message body and attachment, of the email to be sent by the mobile client device 201 and other data. The EAS parser 211 forwards the message body, attachment, and other data retrieved by the EAS parser 211 to the DLP engine 212 (see arrow 222).

Receiving data from a mobile client device 201 poses a different problem compared to providing data to the mobile client device 201. In particular, receiving data from a mobile client device 201 involves preventing prohibited content from being introduced into the private computer network, whereas providing data to the mobile client device 201 involves preventing protected content from being transferred out of the private computer network into an unauthorized mobile client device. In the example of FIG. 3, for data received from the mobile client device 201, the DLP engine 212 determines if the data comprise prohibited content, such as infected files, non-compliant email content, and malicious uniform resource locator (URL), for example. In one embodiment, the DLP engine 212 compares the data to a database or listing of prohibited content. For file attachments, the DLP engine 212 may forward the file attachment to the antivirus 215 to determine if the file attachment is infected with a computer virus. When the DLP engine 212 detects prohibited content, the DLP engine 212 may so inform the EAS parser 211, which in response blocks the corresponding network traffic to prevent the prohibited content from being transferred into the private computer network.

Providing data to the mobile client device 201 during synchronization involves making sure that protected content does not get transferred to an unauthorized mobile client device. This is in marked contrast to other email synchronization techniques where the primary focus is on detecting spam and malware. When an email (or other data) is being transferred from the messaging server 202 to the mobile client device 201, the EAS parser 211 parses the network traffic carrying the email and retrieves email elements, such as the email's message body, attachment, and other data (see arrow 221). The EAS parser 211 forwards the retrieved email elements to the DLP engine 212, which scans the email elements for prohibited content (see arrow 222). In one embodiment, the DLP engine 212 scans the email elements for protected content indicated in the preconfigured compliance templates 213 (see arrow 223). The DLP engine 212 provides the result of the DLP scanning to the EAS parser 211 (see arrow 224). When the result of the DLP scanning indicates that the email contains protected content, such as when the email contains personally identifiable information as indicated in a compliance template 213 for the relevant country, the EAS parser 211 may first determine if the mobile client device 201 is authorized to receive the protected content. If the mobile client device 201 is not authorized to receive the protected content, the EAS parser 211 may block the synchronization to prevent the mobile client device 201 from receiving the protected content. The EAS parser 211 may allow the synchronization to proceed when the email does not contain protected content, or contains protected content that the mobile client device 201 is authorized to receive (see arrow 225).

The mobile client device 201 may also receive a file from a network file server 216. The network file server 216 may comprise a computer for providing data storage and may be part of a cloud data storage network, for example. In one embodiment, a file attachment to an email may be uploaded to the network file server 216. Instead of attaching the file to the email, a download link to the file is included in the email. The process of replacing a file attachment with a download link in an email may be performed automatically under program control or manually by the sender. For example, the messaging server 202 or some other component may remove an attached file from an email, upload the file to the network file server 216, and insert a download link to the file in the email. Before providing the file to the mobile client device 201, the network file server 216 provides the file to the DLP engine 212 (see arrow 231), which scans the file for protected content indicated in the compliance templates 213 or some other database or listing. The network file server 216 may also provide the file to an antivirus 215 (see arrow 232), which scans the file for computer viruses. The network file server 216 may also provide the file to the encryption module 214 for encryption into an encrypted file (see arrow 233).

The mobile client device 201 may receive the email containing the downlink to the now encrypted file after email synchronization with the messaging server 202. The mobile client device 201 receives the encrypted file from network file server 216 when the user activates the download link (see arrow 234). As before, the EAS parser 211 or some other component of the mobile email protection system 210 may block the email synchronization when the file includes protected content that the mobile client device 201 is not authorized to receive.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A system comprising:
a mobile client device running a mobile operating system;
a messaging server of a private computer network and being accessed by the mobile client device for email synchronization from outside the private computer network in accordance with an email synchronization protocol; and
a mobile email protection system through which network traffic for the email synchronization between the mobile client device and the messaging server goes through, the mobile email protection system parsing the network traffic to retrieve an email element from an email in the network traffic, comparing the email element to a plurality of monitored contents indicated in one of a plurality of preconfigured compliance templates to identify protected content, inspecting the network traffic for prohibited content that is being transmitted from the mobile client device to the private computer network by scanning the network traffic against a database or listing of monitored contents, blocking the email synchronization when the email element includes a monitored content in the plurality of monitored contents indicated in one of the plurality of preconfigured compliance templates and the mobile client device is not authorized to receive the protected content, and blocking the email synchronization to prevent the prohibited content from entering the private computer network when the network traffic includes a monitored content indicated in the database or listing of monitored contents.

2. The system of claim 1 wherein the plurality of preconfigured compliance templates indicates protected contents for particular countries.

3. The system of claim 2 wherein the plurality of preconfigured compliance templates indicates personally-identifiable information recognized in particular countries.

4. The system of claim 1 wherein the mobile client device comprises a smartphone.

5. The system of claim 1 wherein the mobile client device receives an encrypted and scanned file from the mobile email protection system.

6. The system of claim 5 wherein the file is scanned for data loss prevention.

7. The system of claim 5 wherein the file is scanned for computer viruses.

8. The system of claim 1 wherein the email element comprises an attachment of the email.

9. A computer-implemented method performed by a mobile email protection system, the method comprising:
receiving in the mobile email protection system network traffic for email synchronization between a mobile client device that runs a mobile operating system and a messaging server, the messaging server being inside a private computer network and the mobile client device being outside the private computer network, the mobile email protection system being between the messaging server and the mobile client device;
parsing the network traffic to retrieve an email element of an email that is being synchronized between the mobile client device and the messaging server;
scanning the email element for monitored contents indicated in a preconfigured compliance template that identifies protected contents;
inspecting the network traffic for a prohibited content that is being transmitted from the mobile client device to the private computer network by scanning the network traffic against a database or listing of predetermined monitored contents;
blocking the email synchronization to prevent the prohibited content from entering the private computer network when the network traffic includes a monitored content indicated in the database or listing of predetermined monitored contents;
and
blocking the email synchronization when the email element includes a monitored content indicated in the preconfigured compliance template.

10. The method of claim 9 wherein the preconfigured compliance templates indicates protected contents for a particular country.

11. The method of claim 10 wherein the preconfigured compliance template indicates personally-identifiable information recognized in the particular country.

12. The method of claim 9 wherein the mobile client device comprises a smartphone.

13. The method of claim 9 further comprising providing the mobile client device an encrypted and scanned file.

14. The method of claim 13 wherein the file is scanned for data loss prevention.

15. The method of claim 13 wherein the file is scanned for computer viruses.

16. A system comprising:
a messaging server in a private computer network;
a mobile client device that is outside the private computer network, the mobile client device running a mobile operating system and performing email synchronization with the messaging server to receive an email from the private computer network and to transfer data to the private computer network; and
a mobile email protection system receiving network traffic for the email synchronization between the messaging server and the mobile client device, the mobile email protection system parsing the network traffic for the email and scanning the email for a plurality of monitored contents, inspecting the network traffic for prohibited content that is prohibited from entering the private computer network by scanning the network traffic against a database or listing of predetermined monitored contents, blocking the email synchronization when the email includes a protected content included in the plurality of monitored contents, and blocking the email synchronization to prevent the prohibited content from entering the private computer network when the network traffic includes a monitored content in the database or listing of monitored contents.

17. The system of claim 16 wherein the protected content is indicated in one of a plurality of preconfigured compliance templates.

18. The system of claim 17 wherein the plurality of preconfigured compliance templates are for particular countries.

19. The system of claim 16 wherein the mobile client device comprises a smartphone.

20. The system of claim 16 wherein the mobile client device is performing the email synchronization with the messaging server to send an outgoing email and the mobile email protection system scans the outgoing email for the protected content.

* * * * *